(12) United States Patent
Yoon

(10) Patent No.: US 6,335,987 B1
(45) Date of Patent: Jan. 1, 2002

(54) MULTIPLEX STORING APPARATUS FOR DIGITAL STILL CAMERA

(75) Inventor: Sang Hyeon Yoon, Anyang (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/222,945

(22) Filed: Dec. 30, 1998

(30) Foreign Application Priority Data

Dec. 30, 1997 (KR) .............................. 97-79753

(51) Int. Cl.[7] ................................ G06K 9/36
(52) U.S. Cl. ...................... 382/232; 348/223
(58) Field of Search ............ 382/232; 348/223

(56) References Cited

U.S. PATENT DOCUMENTS 6,075,562 A * 6/2000 Sakaguchi et al. .......... 348/223

OTHER PUBLICATIONS

Chan et al., "Video CCD Based Portable Digital Still Camera", IEEE Transactions on Consumer Electronics, vol. 41, No. 3, pp. 455–459 (Abstract), Aug. 1995.*
Wang et al., "A Single Chip CCD Signal Processor for Digital Still Cameras", IEEE Transactions on Consumer Electronics, vol. 40, No. 3, pp. 476–483 (Abstract), Aug. 1995.*

* cited by examiner

Primary Examiner—Jose L. Couso
Assistant Examiner—Anh Hong Do
(74) Attorney, Agent, or Firm—Sughrue Mion, PLLC

(57) ABSTRACT

A multiplex storing apparatus for a digital still camera including a CCD (Charge Coupled Device) for converting an image signal of an object inputted through a lens unit into an electrical signal, a CDS (Correlated Double Sampling)/AGC (Automatic Gain Control) for removing noises from the electrical signal inputted from the CCD and automatically amplifying and controlling the gains of the signals for uniformly outputting the signals even when the level of the image signals are varied, and A/D (Analog/Digital) converter for converting an analog image signal inputted from the CDS/AGC into a digital image signal, a memory for temporarily storing an image information of one (1) frame which is converted into the digital image signal by the A/D converter, a camera position detector for detecting a tilting degree of the digital still camera and judging the horizontal and vertical picturing state of the digital still camera, a controller for outputting a control signal by which the entire operation of the digital still camera is controlled, and pictured images stored in the memory are compressed and stored in a horizontally or vertically pictured state without any changes in their size in accordance with the horizontal and vertical picturing state of the digital still camera detected by the camera position detector, and a compression processor for compressing the pictured images stored in the memory in accordance with a control of the controller.

2 Claims, 4 Drawing Sheets

OBJECT VIEWED VIA CAMERA   STATE STORED IN MEMORY   STATE STORED IN COMPRESSION STORING MEMORY

OBJECT VIEWED VIA CAMERA   STATE STORED IN MEMORY   STATE STORED IN COMPRESSION STORING MEMORY

OBJECT VIEWED
VIA CAMERA

STATE STORED
IN MEMORY

STATE STORED
IN COMPRESSION
STORING MEMORY

OBJECT VIEWED
VIA CAMERA

STATE STORED
IN MEMORY

STATE STORED
IN COMPRESSION
STORING MEMORY

MULTIPLEX STORING APPARATUS FOR DIGITAL STILL CAMERA

BACKGROUND OF THE INVENTION

1. Field of the Invention

The present invention relates to a multiplex storing apparatus for a digital still camera, and in particular to an improved multiplex storing apparatus for a digital still camera which is capable of storing a currently pictured image into a semiconductor memory device irrespective of a horizontal and vertical picturing when picturing an object using a digital still camera.

2. Description of the Conventional Art

Generally, the digital still camera is directed to a camera capable of picturing an object, storing the thusly pictured image into a compression storing memory such as a semiconductor memory device, and transmitting and receiving an image data between the camera and a computer. Lately, the digital still camera has become small-sized and light for easier handling.

The above-described digital camera converts an image data input through a lens into an electrical signal using an optical/electrical conversion device such as a CCD(Charge Coupled Device) and electrically processes the data for a storing and reproducing operation. Thereafter, the thusly processed data are stored into a compression storing memory for thereby transmitting and receiving the data using the computer.

Therefore, the image data pictured by the digital still camera is stored into the computer for increasing the storage capacity of the digital camera. Further, the digital still camera may be controlled using the computer.

Lately, the above-described still camera has received peoples' attention as the use of the computer is increased.

Therefore, it is possible to edit the pictured images on a screen of a computer display apparatus, make an internet home page or a presentation document, and output the edited images using an output apparatus such as a printer. In addition, the processed data may be stored in a hard disk or a compact disc.

In the digital still camera, a darkroom work and a chemical process are not needed for developing an image. In addition, it is possible to directly check the pictured object. Since the stored image information is electrically processed, the camera is connected with the computer. The image data may be edited in the computer and may be transmitted to a predetermined apparatus. Thus, the digital still camera is widely applicable.

For example, it is possible to make an internet home page using the images pictured by the digital still camera by connecting to the internet, and various reports may be easily made by inserting the pictured images thereinto. The data of a commemorative photo pictured for a school graduation or wedding ceremony may be used for an electronic album or may be stored into a disk.

FIGS. 1A through 1C illustrate a storing method based on a horizontal and vertical picturing of a conventional digital still camera.

As shown therein, when the image pictured using the digital still camera is stored into the semiconductor memory device, the data from the left uppermost pixels R1C1 to the right lowermost pixels RnCn as shown in. FIG. 1A are read and stored irrespective of the picturing state of the horizontal and vertical picturing of the camera.

Therefore, when picturing in the horizontal state of the digital still camera, the state that the object is viewed through the camera, the state of the image temporarily stored in the memory, and the state that the image is stored in the compression storing memory are all the same.

However, when picturing in the vertical state of the digital still camera, as shown in FIG. 1C, the state of the image temporarily stored in the memory and the state of the image which is stored in the compression storing memory are the states that the images are rotated at an angle of 90° compared to the images viewed through the camera.

Namely, in the case that the object is pictured in the vertical state, the images stored in the compression storing memory are viewed in a 90° rotated state.

Therefore, when picturing the objects using the conventional digital still camera, since the pictured images are stored into the semiconductor memory device in accordance with a predetermined format irrespective of the horizontal or vertical picturing, when editing the pictured images by connecting the digital still camera and the computer, the images pictured in the vertical state needs to be normally rotated since the images are stored in the rotated state, thereby causing much inconvenience.

SUMMARY OF THE INVENTION

It is an object of the present invention to provide a multiplex storing apparatus for a digital sill camera which is capable of storing a currently pictured image into a semiconductor memory device irrespective of a horizontal or vertical picturing when picturing a predetermined object using a digital still camera.

In order to achieve the above objects, there is provided a multiplex storing apparatus for a digital still camera which includes a CCD(Charge Coupled Device) for converting an image signal of an object inputted through a lens unit into an electrical, signal, a CDS(corelated Double Sampling)/AGC (Automatic Gain Control) for removing noises from the electrical signal input from the CCD and automatically amplifying and controlling the gains of the signals for uniformly outputting the signals even when the level of the image signals are varied, an A/D(Analog/Digital) converter for converting an analog image signal inputted from the CDS/AGC into a digital image signal, a memory for temporarily storing an image information of one(1) frame which is converted into the digital image signal by the A/D converter, a camera position detector for detecting a degree of tilt of the digital still camera and judging the horizontal and vertical picturing state of the digital still camera, a controller for outputting a control signal by which the entire operation of the digital still camera is controlled, and pictured images stored in the memory are compressed and stored in a horizontally or vertically pictured state without any changes in their size in accordance with the horizontal and vertical picturing state of the digital still camera detected by the camera position detector, a compression processor for compressing the pictured images stored in the memory in accordance with a control of the controller, and a compression storing memory for sequentially storing the image signals compressed by the compression processor in accordance with a control of the controller.

In addition, the controller outputs a control signals by which the data from the left uppermost pixels to the right lower pixels of the images stored in the memory are sequentially stored in the case of the horizontal picturing state as a result of the detection by the camera position detector, and by which the data from the left lowermost pixels to the right uppermost pixels stored in the memory are sequentially stored in the case of the vertical picturing state as a result of the detection by the camera position detector.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus should not be construed to limit present invention, and wherein.

DETAILED DESCRIPTION OF THE INVENTION

The embodiments of the multiplex storing apparatus for a digital still camera according to the present invention will be explained with reference to the accompanying drawings.

Figure 1A:
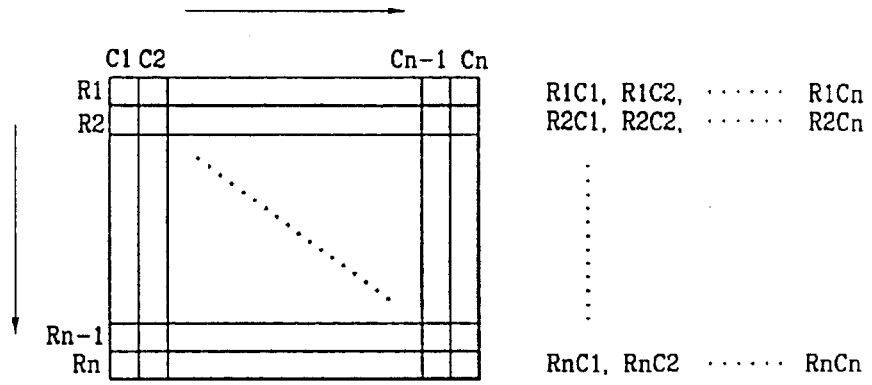
FIGS. 1A through 1C are views illustrating a storing method based on a horizontal and vertical picturing of a conventional digital still camera.
Figure 1B:
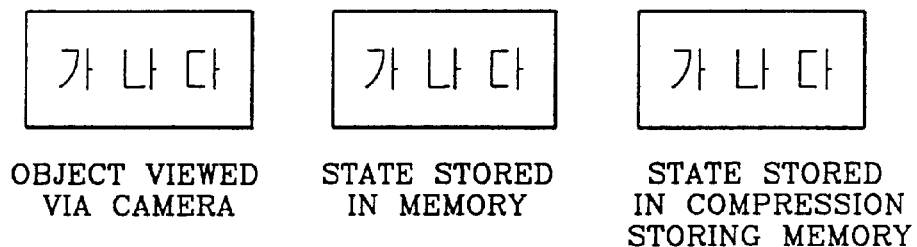
Figure 1C:
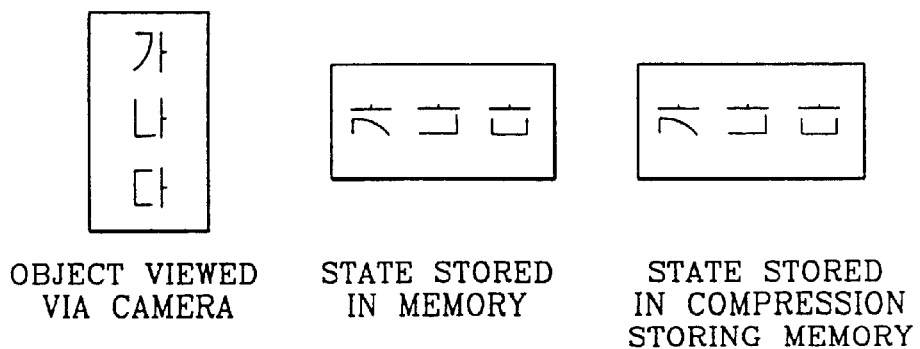
Figure 2:
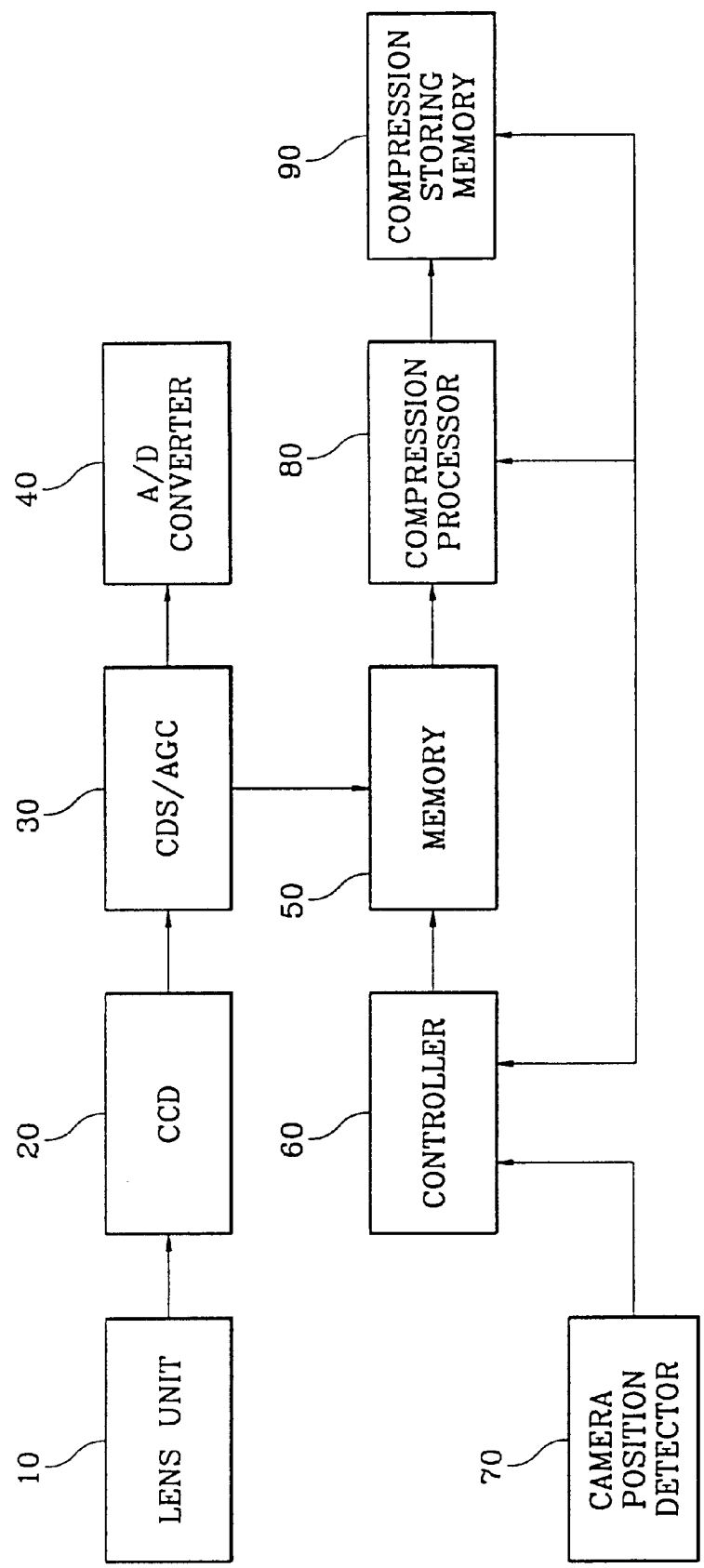
FIG. 2 is a block diagram illustrating an operation of a digital still camera during a horizontal and vertical picturing according to the present invention.

FIG. 2 is a block diagram illustrating an operation of a digital still camera during a horizontal and vertical picturing.

As shown therein, a CCD(Charge Coupled Device) 20 converts an image signal of an object incident through a lens unit 10 into an electrical signal.

Driving pulses for extracting the signals of the CCD 20 are supplied from a controller 60.

A CDS(Corelated Double Sampling)/AGC(Automatic Gain control) 30 removes noises from the electrical signal input from the CCD 20 and automatically amplifies and controls the gain so that the signals are uniformly output even when the level of the image signals is varied.

An A/D(Analog/Digital) converter 40 converts an analog image signal from the CDS/AGC 30 into a digital image signal.

A memory 50 stores the image information of one(1) frame input from the A/D converter 40, and the controller 60 processes the signals.

At this time, the image information stored in the memory 50 is obtained by simply changing the signal from the CCD 20 into a digital signal. In this case, the DRAM(Dynamic Random Access Memory) is generally used.

The controller 60 controls the entire operation of the digital still camera and processes a white balance, an image outline correction, a luminance and chrominance signal conversion, etc. of the image inputted from the memory 50.

In addition, the controller 60 outputs a control signal by which the images temporarily stored in the memory 50 in accordance with a horizontal or vertical picturing state of the camera detected by a camera position detector 70 are compressed and stored into the compression storing memory 90 without the variation in their size.

The camera position detector 70 detects the tilt of the camera and a horizontal and vertical picturing state and outputs a result of the detections to the controller 60.

A compression processor 80 compresses the image signals so that a large amount of images are stored into the compression storing memory 90 having a limited storing space.

The compression storing memory 90 sequentially stores the image signals compressed and input from the compression processor 80.

In addition, the compression storing memory 90 is capable of performing a high speed storing and reproducing operation.

The reproducing operation is generally performed using a personal computer(PC). The stored images may be stored, processed, and output by a printer based on a predetermined image editing program.

The compression storing memory 90 is formed of a flash memory which is a non-volatile memory or a magnetic tape.

FIGS. 3A through 3D are views illustrating a storing method based on a horizontal and vertical picturing of a digital still camera according to the present invention.

Figure 3A:
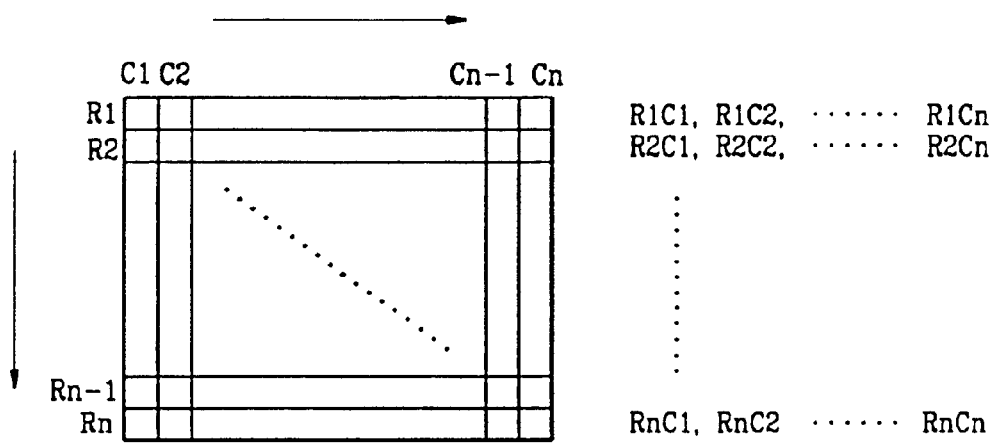
FIGS. 3A through 3D are views illustrating a storing method based on a horizontal and vertical picturing of a digital still camera according to the present invention.

As shown therein, when picturing in the horizontal state of the digital still camera, as shown in FIG. 3A, the data from the left uppermost pixels R1C1 and R1C2 to the right lowermost pixels RnCn−1 and RnCn are sequentially stored into the compression storing memory 90.

Figure 3B:
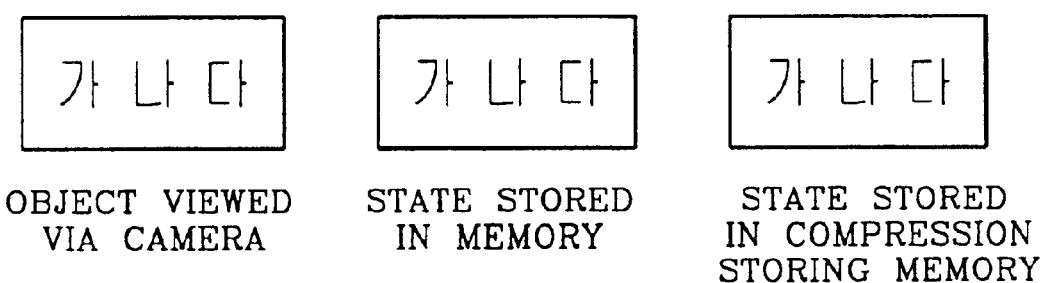

For example, when picturing in a state that the size of the image is 640×480, as shown in FIG. 3B, the state that the object is viewed through the camera, the state that the image is temporarily stored in the memory 50, and the state stored in the compression storing memory 90 are all in the horizontal state.

Figure 3C:
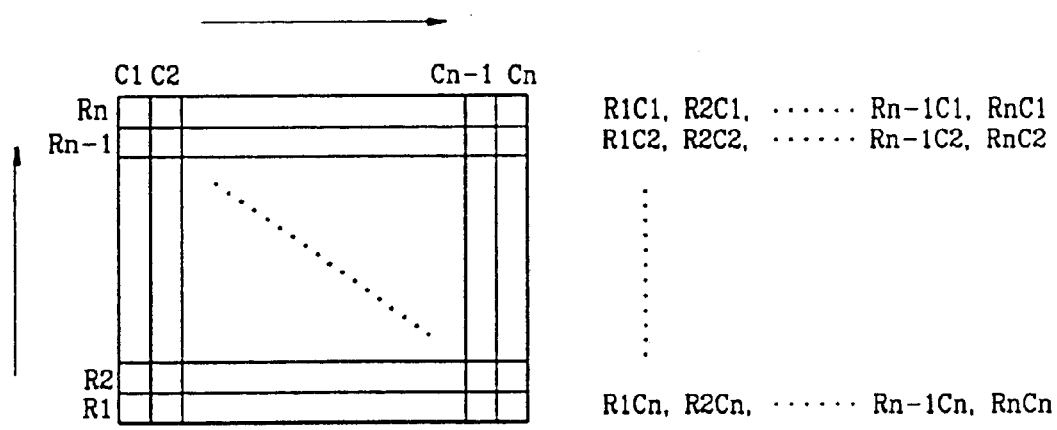

In addition, when picturing in the vertical state of the digital still camera, as shown in FIG. 3C, the data from the left lowermost pixels R1C1 and R2C1 to the right uppermost pixels Rn−1Cn and RnCn are sequentially read and stored into the compression storing memory 90.

Figure 3D:
Figure 3D:
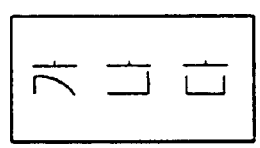
Figure 3D:
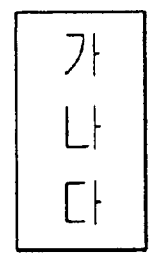

For example, when picturing in the vertical state that the size of the image is 480×640, as shown in FIG. 3D, the image which is temporarily stored in the memory 50 has a 90° rotated state, and the image stored in the compression storing memory 90 is in the same state as the object viewed through the camera.

Namely, even when the object is pictured using the digital still camera in the 640×480 horizontal state or the 480×640 vertical state, the image is directly stored into the compression storing memory 90 without any changes in the size of the image. Namely, the images pictured by a user are directly stored.

Next, the operation of the multiplex storing apparatus for a digital still camera according to the present Invention will be explained.

First, an image signal of an object input through the lens unit 10 is converted into an electrical signal through the CCD 20, and noises are removed from the electrical signals input from the CCD 20 through the CDS/AGC 30, and the signals are amplified, and the gains of the same are automatically controlled.

The signals inputted from the CDS/AGC 30 are converted into a digital signal by the A/D converter 40 and are temporarily stored into the memory 50. The white balance, outline correction and luminance and chrominance signal conversion of the images pictured based on the controller 60 are processed.

At this time, the horizontal or vertical picturing state of the digital still camera is detected by the camera position detector 70 and is inputted into the controller 60.

The controller 60 outputs a control signal so that the images temporarily stored in the memory is compressed and then stored into the compression storing memory 90 in a pictured state in accordance with the horizontal or vertical picturing state of the digital still camera detected by the camera position detector 70.

Namely, in the case of the horizontal picturing state as a result of the detection of the camera position detector 70, the controller 60 outputs a control signal to the compression processor 80 and the compression storing memory 90 so that the data from the left uppermost pixels R1C1 and R1C2 to the right lowermost pixels RnCn−1 and RnCn of the images stored in the memory 50 are read and stored for thereby compressing and storing the horizontal picturing images.

In addition, in the case of the vertical picturing state as a result of the detection of the camera position detector 70, the controller 60 outputs a control signal to the compression processor 80 and the compression storing memory 90 so that the data from the left lowermost pixels R1C1 and R2C1 to the right uppermost pixels Rn−1Cn and RnCn are sequentially stored for thereby compressing and storing the horizontal picturing images.

At this time, the 640×480 horizontal picturing image is input into the compression storing memory 90 when the size of the image pictured using the digital still camera in the horizontal state is 640×480 irrespective of the horizontal or vertical picturing state, and In the vertical state, if the size of the image is 480×640, the 480×640 vertical picturing image is directly stored into the compression storing memory 90 without any changes.

The images pictured in the horizontal or vertical state by a user is compression by the compression processor 80 and then is stored into the compression storing memory 90 in accordance with a control signal from the controller 60.

The image signals are compressed for the reason that a large amount of the images are stored in to the memory having a limited storing space.

As described above, the compressed image signals of the digital still camera are converted into a transmission signals by an encoder(not shown) and are outputted to the computer. At this time, since the images pictured in the horizontal or vertical state are directly displayed on the screen of the computer, it is not needed to rotate the vertically pictured image, and the images are edited thereon without rotating the same.

The present invention is not limited to the above-described examples that the images are pictured in the horizontal or vertical state. Even when the image is pictured at a predetermined angle, for example, at 45°, of the digital still camera, the multiplex storing method according to the present invention may be adapted.

As described above, in the multiplex storing apparatus for a digital still camera according to the present invention, even when a user pictures an image in a vertical state of the camera, since the vertically pictured image is directly stored in the compression storing memory, it is possible to display the thusly pictured image on the screen of the computer without rotating the images for thereby directly edit the same on the screen of the computer.

Although the preferred embodiments of the present invention have been disclosed for illustrative purposes, those skulled in the art will appreciate that various modifications, additions and substitutions are possible, without departing from the scope and spirit of the invention as recited in the accompanying claims.

What is claimed is:

1. A multiplex storing apparatus for a digital still camera, comprising:

a charge couple device (CCD) for converting an image signal of an object input through a lens unit into an electrical signal;

a Correlated Double Sampling (CDS)/Automatic Gain Control (AGC) for removing noises from the electrical signal and automatically amplifying and controlling gains associated with the electrical signal for uniformly outputting the electrical signal even when the level of the image signal is varied;

an A/D converter for converting an analog image signal inputted from the CDS/AGC into a digital image signal;

a memory for temporarily storing an Image Information of one (1) frame of the digital image signal by the A/D converter;

a camera position detector for detecting a degree of tilt in the digital still camera and judging the horizontal and vertical picturing state of the digital still camera;

a controller for outputting a control signal by which an entire operation of the digital still camera is controlled, wherein pictured images stored in the memory are compressed and stored in one of a horizontally and vertically pictured state without any changes in a size of said picture images in accordance with the horizontal and vertical picturing state of the digital still camera;

a compression processor for compressing the pictured Images stored in the memory in accordance with a control of the controller; and a compression storing memory for sequentially storing the Image signals compressed by the compression processor in accordance with a control of the controller.

2. The apparatus of claim 1, wherein said controller outputs control signals by which a data from left uppermost pixels to right lower pixels of the Images stored in the memory are sequentially stored when a horizontal picturing state is detected, and by which a data from the left lowermost pixels to the right uppermost pixels stored in the memory are sequentially stored when a vertical picturing state is detected as a result of the detection by the camera position detector.

\* \* \* \* \*